(12) United States Patent
Torii et al.

(10) Patent No.: US 9,747,535 B2
(45) Date of Patent: Aug. 29, 2017

(54) IMAGE FORMING APPARATUS, IMAGE FORMING METHOD, AND NON-TRANSITORY COMPUTER-READABLE MEDIUM

(71) Applicant: FUJI XEROX CO., LTD., Tokyo (JP)

(72) Inventors: Takeshi Torii, Kanagawa (JP); Mitsuhiro Fukushima, Kanagawa (JP); Koji Nishiyama, Kanagawa (JP); Junichi Horii, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 15 days.

(21) Appl. No.: 14/608,402

(22) Filed: Jan. 29, 2015

(65) Prior Publication Data
US 2016/0086062 A1 Mar. 24, 2016

(30) Foreign Application Priority Data
Sep. 22, 2014 (JP) ................................. 2014-192692

(51) Int. Cl.
G06F 3/12 (2006.01)
G06K 15/02 (2006.01)
G06K 15/00 (2006.01)

(52) U.S. Cl.
CPC ..... G06K 15/1813 (2013.01); G06K 15/1836 (2013.01); G06K 15/1856 (2013.01); G06K 15/408 (2013.01)

(58) Field of Classification Search
None
See application file for complete search history.

(56) References Cited

U.S. PATENT DOCUMENTS

| | | | |
|---|---|---|---|
| 8,675,237 B2 | 3/2014 | Matsukawa | |
| 8,736,876 B2 | 5/2014 | Hayakawa | |
| 2008/0007754 A1* | 1/2008 | Torii | G06K 15/02 358/1.12 |
| 2011/0194142 A1* | 8/2011 | Wakana | G06K 15/1856 358/1.15 |
| 2011/0255126 A1* | 10/2011 | Iguchi | H04N 1/00005 358/1.15 |
| 2012/0133984 A1* | 5/2012 | Hayakawa | G06F 3/1211 358/1.16 |
| 2012/0327439 A1* | 12/2012 | Taima | G06K 15/1856 358/1.13 |

(Continued)

FOREIGN PATENT DOCUMENTS

| | | |
|---|---|---|
| JP | 2007-310450 A | 11/2007 |
| JP | 2012-118738 A | 6/2012 |
| JP | 2013-63543 A | 4/2013 |

*Primary Examiner* — Marivelisse Santiago Cordero
*Assistant Examiner* — Neil R McLean
(74) *Attorney, Agent, or Firm* — Sughrue Mion, PLLC

(57) ABSTRACT

An image forming apparatus includes a receiving unit that receives plural pieces of print data described in plural types of page description languages, plural drawing processors that respectively correspond to the plural types of page description languages, extract specific drawing objects from the plural pieces of print data, and convert the specific drawing objects into print image data, and an output unit that compares the print image data that the drawing processors have converted the specific drawing objects into, and outputs comparison results.

20 Claims, 9 Drawing Sheets

(56) References Cited

U.S. PATENT DOCUMENTS

2013/0070289 A1\* 3/2013 Matsukawa ........... G06F 3/1208
                                                    358/1.15
2014/0092410 A1\* 4/2014 Taima ................... G06F 3/1234
                                                    358/1.13

\* cited by examiner

FIG. 3

```
/CS1 cs 0.941 0.941 0.823 sc
q 272.992 173.235 65.292 14.669 re 0 G f Q         ← DRAWING REGION
/CS1 cs 1 1 1 sc
q 338.285 173.235 206.292 14.669 re 0 G f Q
39.682 173.094 m 572.369 173.094 l s
/F1 Do                                              ← FORM REGION
/CS1 cs 0 0 0 sc
q 261 0 0 113 311.530 57.118 cm /I5 Do Q            ← IMAGE REGION
/CS1 cs 1 1 1 sc
BT
/G1F0 11.0 Tf
/CS1 cs 0 0 0 sc
168.647 284.552 Td
(USE STORE NAME) Tj                                 ← CHARACTER REGION
ET
BT
281.189 284.552 Td
(USE AMOUNT) Tj                                     ← CHARACTER REGION
ET
```

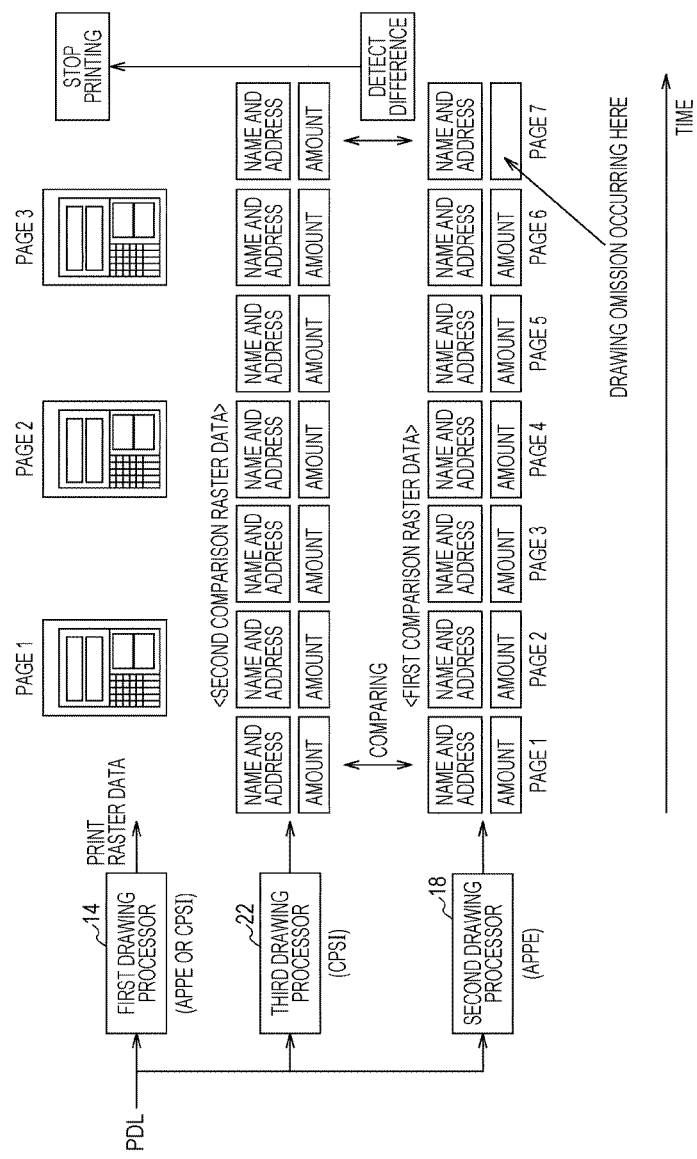

FIG. 6

PAGE 1

```
12 0 obj
<<
/Parent 2 0 R
/Resources 28 0 R
/MediaBox [0 0 595.295 841.895]
/fx_PageNum 1
/Type /Page
/Contents 29 0 R
>>
endobj 28 0 obj
<<
/ColorSpace
<<
/CS1 /DeviceRGB
>>
/Font
<<
/G1F6 16 0 R
/G1F0 17 0 R
>>
/XObject
<<
  /F7 19 0 R
  /I3 30 0 R
  /I23 31 0 R
  /I112 32 0 R
>>
/ProcSet [/PDF /Text /ImageC]
>>
endobj
```

PAGE 2

```
13 0 obj
<<
/Parent 2 0 R
/Resources 34 0 R
/MediaBox [0 0 595.295 841.895]
/fx_PageNum 2
/Type /Page
/Contents 35 0 R
>>
endobj 34 0 obj
<<
/ColorSpace
<<
/CS1 /DeviceRGB
>>
/Font
<<
/G1F6 16 0 R
>>
/XObject
<<
  /F7 19 0 R      ← REUSE DRAWING OBJECT
  /I3 30 0 R
  /I14 33 0 R
>>
/ProcSet [/PDF /Text /ImageC]
>>
endobj
```

FIG. 7

| ID | TYPE | USE COUNT | PAGES USED |
|---|---|---|---|
| 101 | IMAGE REGION | 4 | 1, 3, 5, 7 |
| 102 | FORM REGION | 10 | 1, 2, 3, 4, 5, 6, 7, 8, 9, 10 |
| 103 | IMAGE REGION | 2 | 2, 7 |
| 104 | IMAGE REGION | 1 | 5 |

IMAGE FORMING APPARATUS, IMAGE FORMING METHOD, AND NON-TRANSITORY COMPUTER-READABLE MEDIUM

CROSS-REFERENCE TO RELATED APPLICATIONS

This application is based on and claims priority under 35 USC 119 from Japanese Patent Application No. 2014-192692 filed Sep. 22, 2014.

BACKGROUND (i) Technical Field

The present invention relates to an image forming apparatus, an image forming method, and a non-transitory computer-readable medium.

(ii) Related Art

In general, print data transmitted from a processing apparatus, such as a personal computer or a workstation, to a printer is described in a page description language (PDL), such as a portable data format (PDF). PDL data is converted into image data (raster data) in a raster format (such as a bitmap format) by a data processing apparatus, called a raster image processor (RIP).

SUMMARY

According to an aspect of the invention, there is provided an image forming apparatus. The image forming apparatus includes a receiving unit that receives plural pieces of print data described in plural types of page description languages, plural drawing processors that respectively correspond to the plural types of page description languages, extract specific drawing objects from the plural pieces of print data, and convert the specific drawing objects into print image data, and an output unit that compares the print image data that the drawing processors have converted the specific drawing objects into, and outputs comparison results.

BRIEF DESCRIPTION OF THE DRAWINGS

Exemplary embodiments of the present invention will be described in detail based on the following figures, wherein:

FIG. 3 illustrates an example of PDL data;

FIG. 5 illustrates a process of a second exemplary embodiment;

FIG. 6 illustrates an example of the PDL data;

FIG. 7 illustrates an example of an object table;

DETAILED DESCRIPTION

Figure 1:
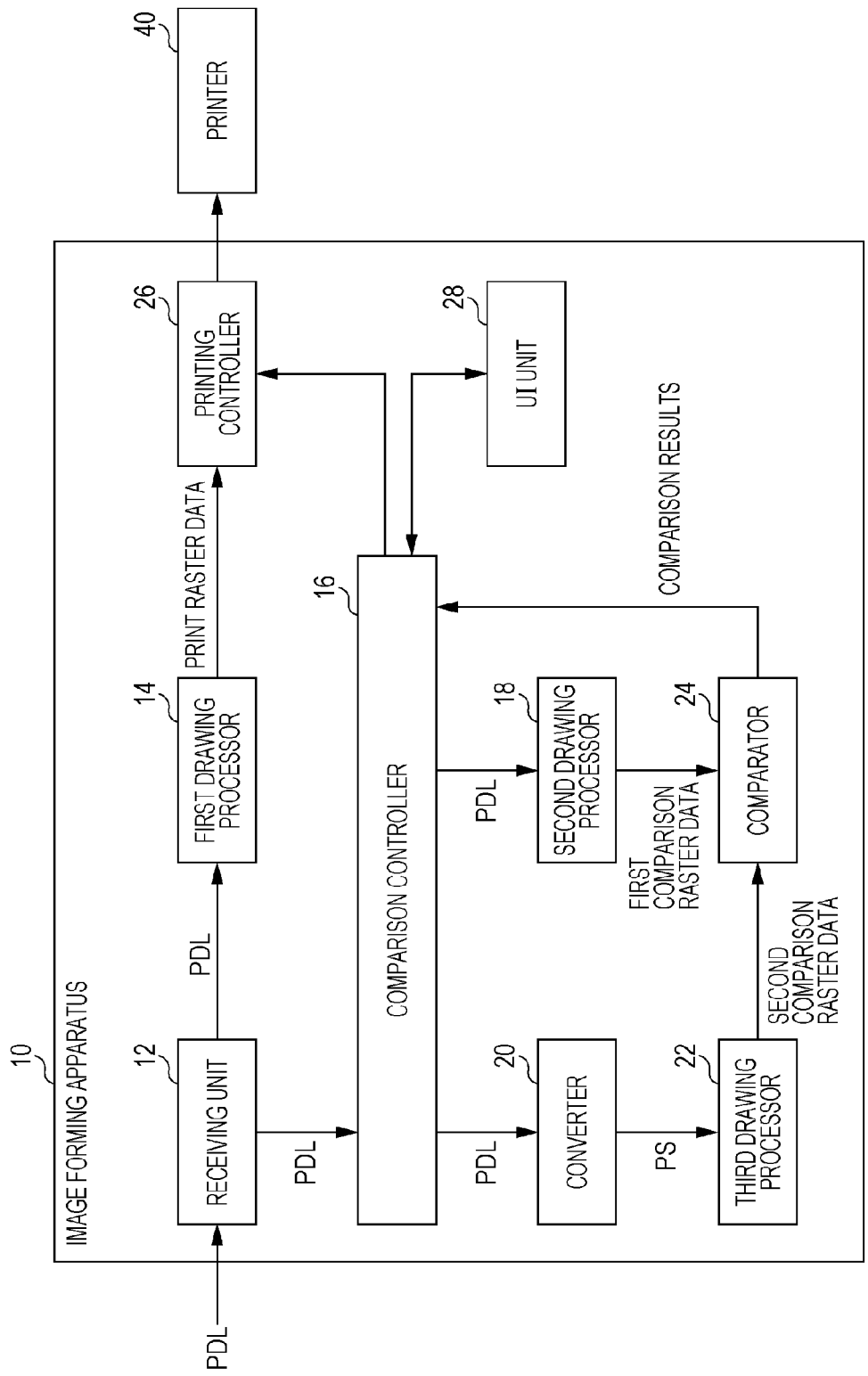
FIG. 1 is a block diagram illustrating an image forming apparatus of exemplary embodiments of the present invention.

FIG. 1 is a block diagram illustrating an image forming apparatus 10 of exemplary embodiments of the present invention. The image forming apparatus 10 receives print data from a processing apparatus, such as a personal computer or a workstation, and converts the print data into raster data that may be handled by a printer 40.

The print data is data in which a drawing command group to draw an image of at least one page as a print target is described using a page description language (PDL). The page description languages include a variety of languages, such as PDF. In the following discussion, the print data described in the page description language is referred to as "PDL data".

The image of a print target page is constructed of a drawing object as an image element. The drawing object is an image that is drawn by a single drawing command of PDL. The PDL data includes position information, format information, and color information of the drawing object. The drawing object includes a character region, a drawing region, an image region (a continuous-tone image, such as a photograph), and a text form. The PDL data may include a repeatedly used drawing object (reuse drawing object). The reuse drawing object is described "XObject" in the PDF data.

A receiving unit 12 in the image forming apparatus 10 receives the PDL data (labeled "PDL" in FIG. 1), and outputs the PDL data to a first drawing processor 14 and a comparison controller 16 in the image forming apparatus 10.

The first drawing processor 14 is a raster image processor (RIP). The first drawing processor 14 converts the PDL data into image data (raster image data) to be supported and handled by a printer 40. The raster data includes information at each pixel (pixel value) forming a print target image. The raster data is bit-map data, for example. The raster data generated by the first drawing processor 14 is referred to as "print raster data" (as labeled in FIG. 1). The first drawing processor 14 converts the PDL data into the print raster data in accordance with a drawing method of Adobe PDF print engine (APPE) or a drawing method of configurable postscript interpreter (CPSI). In accordance with the APPE drawing method, the first drawing processor 14 directly converts PDF data (data in a PDF format) into the print raster data. In accordance with the CPSI drawing method, the first drawing processor 14 converts the PDL data (the data in the PDF format) into image data described in PostScript (Registered Trademark) (hereinafter referred to as "PS data"), and converts the PS data into the print raster data. The print raster data is transferred to the printer 40. The printer 40 forms an image responsive to the print raster data on a recording medium, such a paper sheet.

In the image forming apparatus 10, a comparison controller 16 outputs the PDL data to a second drawing processor 18 and a converter 20. The comparison controller 16 may extract a specific drawing object from the PDL data, and output data of the specific drawing object to the second drawing processor 18 and the converter 20. The specific drawing object is a variable region (which may be different from the other pages), and may be a character region, for example. The specific drawing object may be a reuse drawing object, or a drawing object other than the reuse drawing object. The specific drawing object may be used to detect a print fault. The comparison controller 16 receives from the comparator 24 information indicating comparison results of raster data, and performs a process in response to the comparison results. The comparison process of the raster data is described below.

In the image forming apparatus 10, the second drawing processor 18 is a RIP, and converts the PDL data into the raster data to be supported by and handled by the printer 40. For example, in accordance with the APPE drawing method, the second drawing processor 18 converts the PDL data (the data in the PDF format) into the raster data. In this case, the second drawing processor 18 converts the data of the specific drawing object into the raster data. The raster data converted by the second drawing processor 18 is referred to as "first comparison raster data" (as labeled in FIG. 1). For example, the second drawing processor 18 converts the data of the specific drawing object into the first comparison raster data of 1 bit. If all the PDL data is supplied from the comparison controller 16, the second drawing processor 18 extracts the specific drawing object from the PDL data to generate the first comparison raster data. If the data of the specific drawing object is supplied from the comparison controller 16, the second drawing processor 18 converts the data of the specific drawing object into the first comparison raster data. The second drawing processor 18 outputs the first comparison raster data to a comparator 24 in the image forming apparatus 10.

In the image forming apparatus 10, a converter 20 converts the PDL data (such as the data in the PDF format) into PS data (labeled "PS" in FIG. 1) described in PostScript (Registered Trademark). The converter 20 outputs the PS data to a third drawing processor 22.

The third drawing processor 22 is a RIP, and converts the PDL data into the raster data to be supported and handled by the printer 40. For example, the third drawing processor 22 converts the PS data into the raster data in accordance with the CPSI drawing method. In this case, the third drawing processor 22 converts the data of the specific drawing object into the raster data. The raster data generated by the third drawing processor 22 is hereinafter referred to as "second comparison raster data" (as labeled in FIG. 1). For example, the third drawing processor 22 converts the data of the specific drawing object into the second comparison raster data of 1 bit. If the converter 20 receives all the PDL data from the comparison controller 16 and converts all the PDL data into the PS data, the third drawing processor 22 extracts the specific drawing object from the PS data to generate the second comparison raster data. If the converter 20 receives the data of the specific drawing object from the comparison controller 16 and generates the PS data of the specific drawing object, the third drawing processor 22 converts the PS data of the specific drawing object into the second comparison raster data. Optionally, the converter 20 may extract the specific drawing object from all the PDL data, and generate the PS data representing the specific drawing object. In such a case, the third drawing processor 22 converts the PS data of the specific drawing object into the second comparison raster data. The third drawing processor 22 outputs the second comparison raster data to a comparator 24 in the image forming apparatus 10.

The comparator 24 compares the first comparison raster data with the second comparison raster data, and outputs information representing comparison results to the comparison controller 16. The comparator 24 performs a comparison process on each page. Through the comparison process, a page likely to suffer from a print fault is detected. More specifically, if there is a difference between the two pieces of data, a fault occurs in the RIP process. If printing is actually performed, the print fault may take place on the page having the difference. Through the comparison process, the presence or absence of interchangeability between APPE and CPSI is detected. More specifically, if there is no difference between the two pieces of data, APPE and CPSI are interchangeable with each other. If there is a difference between the two pieces of data, APPE and CPSI are not interchangeable with each other. The comparison process detects the fault or interchangeability. The comparison controller 16 causes a display of a user interface (UI) unit 28 to display information indicative of the comparison results thereon. If a difference is detected between the two pieces of data, the comparison controller 16 may cause the display to display information indicative of the detection of a fault (fault detection information), or may cause the display to display a page number on which the difference has been detected. Also, if a difference is detected, the comparison controller 16 may output the fault detection information to a printing controller 26 in the image forming apparatus 10.

The comparison controller 16, the second drawing processor 18, the converter 20, the third drawing processor 22, and the comparator 24 are used to detect a print fault (to detect a fault in the RIP process). The second drawing processor 18, the converter 20, the third drawing processor 22, and the comparator 24 have a function to perform the process thereof in parallel with the process of the first drawing processor 14.

The printing controller 26 outputs print raster data generated by the first drawing processor 14 to the printer 40. Upon receiving the fault detection information from the comparison controller 16 during a printing operation, the printing controller 26 may stop printing.

The UI unit 28 includes an operation unit and display. The operation unit is an input device, such as an operation panel. The display is a display device, such as a liquid-crystal display.

The printer 40 is, for example, an electrophotographic system printer. The printer 40 forms an image responsive to print raster data on a recording medium, such a paper sheet, using a color material (imaging material), such as toner or ink. The printer 40 may also be a printer that forms an image using a system other than the electrophotographic system.

Figure 2:
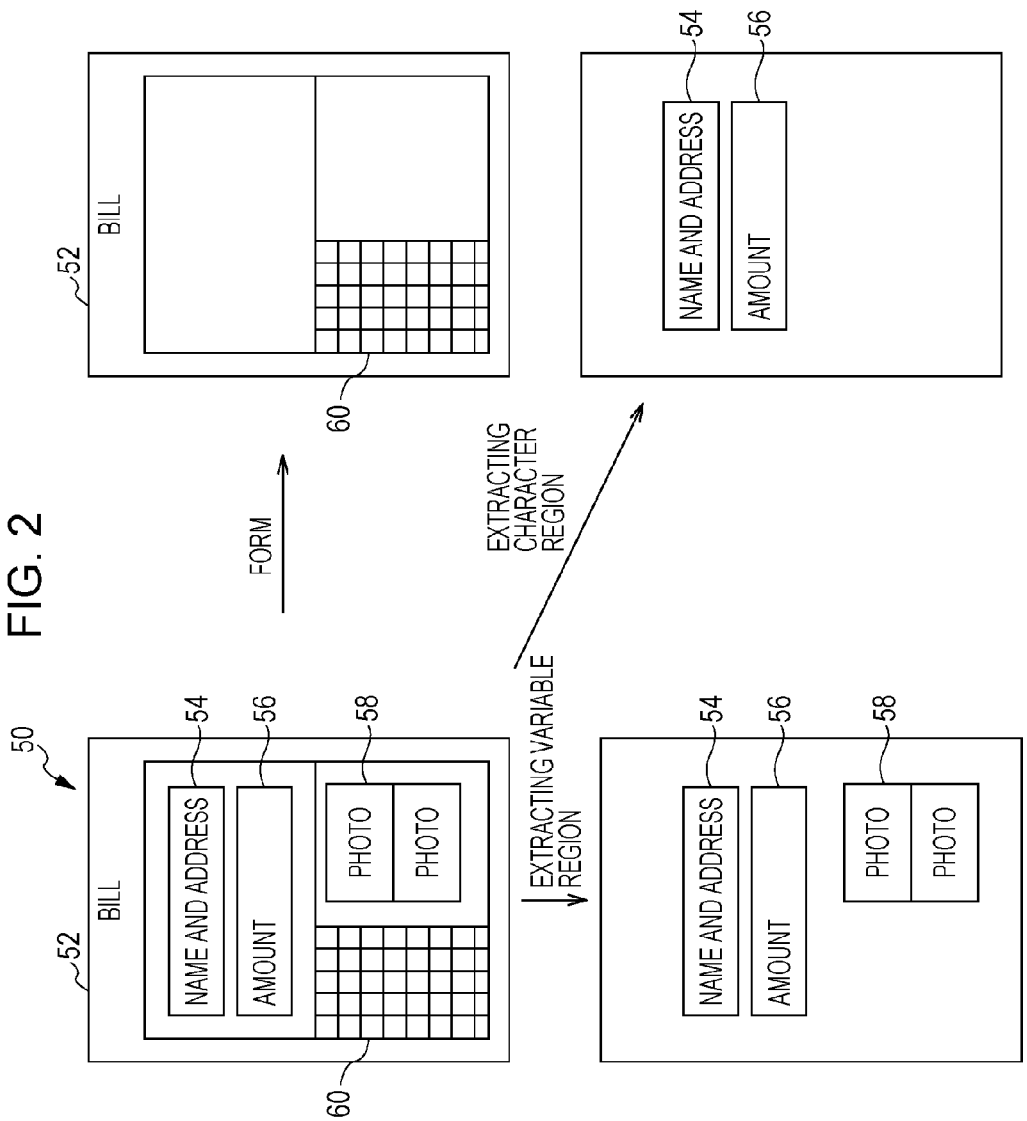
FIG. 2 illustrates an example of a document as a print target.

FIG. 2 illustrates an example of a document 50 as a print target. For example, the document 50 is a bill. The PDL data representing the document 50 is transferred to the image forming apparatus 10. The document 50 includes a form region 52, character regions 54 and 56, an image region 58, and a character region 60 in the form region 52. The form region 52 that is displayed in a predetermined method and is not ready to be modified. The character regions 54 and 56 are variable portions. More specifically, the character regions 54 and 56 are described with contents thereof different from page to page. Referring to FIG. 2, name and address are described in the character region 54, and an amount is described in the character region 56. In other words, personal information is to be described in the character regions 54 and 56. The image region 58 includes a photograph, for example. The image region 58 may be a variable portion or a reuse drawing object.

The comparison controller 16 extracts the character regions 54 and 56 from the PDL data of the document 50 as a specific drawing object, and outputs the data of the character regions 54 and 56 to the second drawing processor 18 and the converter 20. The comparison controller 16 extracts the character regions 54 and 56 from the PDL data of each page. If the image region 58 is a variable portion, the comparison controller 16 may extract the variable portion (the character regions 54 and 56 and the image region 58) from the PDL data of the document 50 as the specific drawing object, and may output the data of the variable portion to the second drawing processor 18 and the converter 20. The comparison controller 16 extracts the variable portion from the PDL data of each page. Since the form region 52 is not a variable portion, the comparison controller 16 does not extract the form region 52 from the PDL data of the document 50. Since the character region 60 in the form region 52 is not a variable portion, the comparison controller 16 does not extract the character region 60 from the PDL data of the document 50. If the comparison controller 16 does not extract the specific drawing object, the second drawing processor 18 and the third drawing processor 22 may extract the specific drawing object.

FIG. 3 illustrates an example of the PDL data (data in the PDF format). The PDL data includes a drawing region, a form region, an image region (an image of a photograph), and a character region. In the PDF format data, the character region may be specified by a Tj operator. The specific drawing object may be extracted by analyzing the PDL data.

Processes of first through third exemplary embodiments performed by the image forming apparatus 10 are described below.

First Exemplary Embodiment

Figure 4:
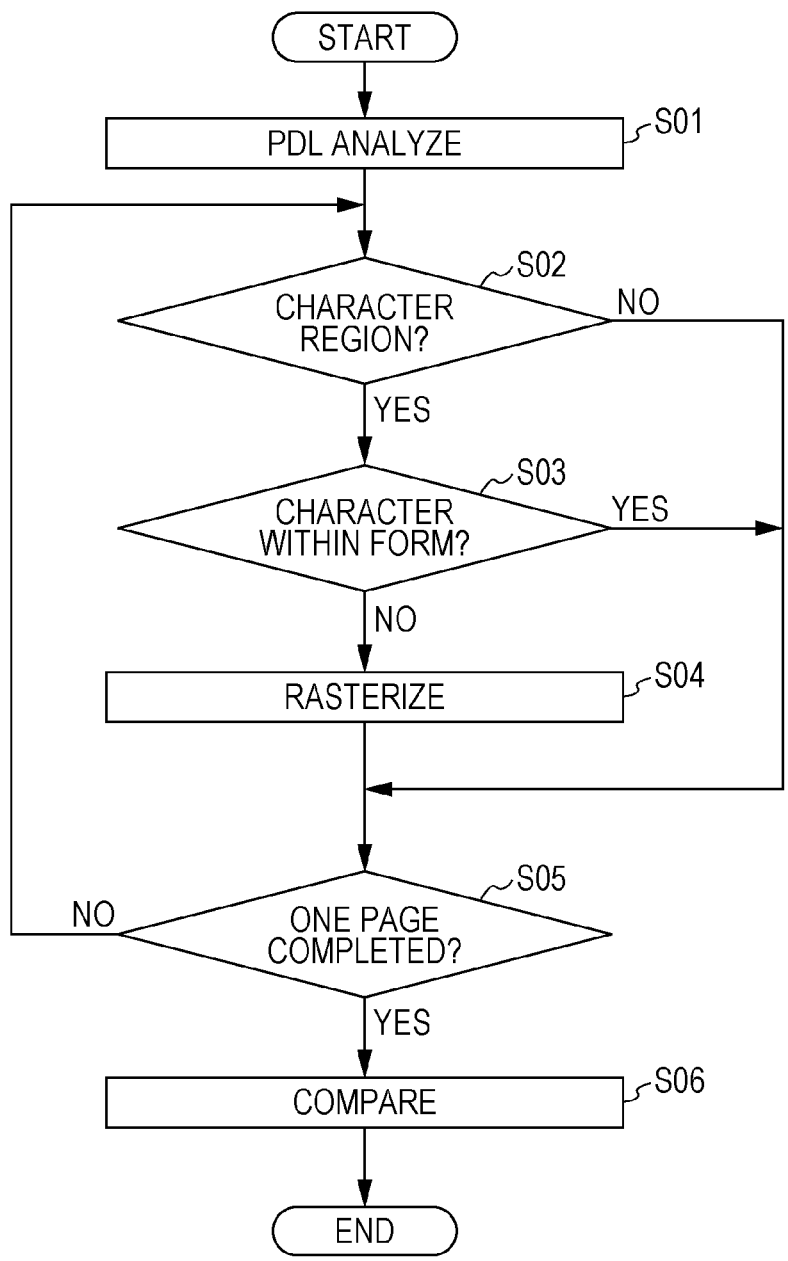
FIG. 4 is a flowchart illustrating a process of a first exemplary embodiment.

A first exemplary embodiment is described with reference to a flowchart of FIG. 4. In the process, the document 50 of FIG. 2 is a print target. The image forming apparatus 10 executes the process discussed below on a per page basis. When the image forming apparatus 10 is supplied with the PDL data of the document 50, the receiving unit 12 receives the PDL data, and outputs the received PDL data to the comparison controller 16. The comparison controller 16 analyzes the PDL data (step S01). The specific drawing object included in the PDL data is thus detected. If the detected drawing object is a character region (yes branch from step S02), processing proceeds to step S03. If the character region does not correspond to the character region 60 in the form region 52 (no branch from step S03), the data of the character region is RIP processed (rasterized) by the second drawing processor 18 and the third drawing processor 22 (step S04). More specifically, the second drawing processor 18 converts the character region (such as the character region 54) into the first comparison raster data in accordance with the APPE drawing method. The converter 20 converts the data of the character region into the PS data, and the third drawing processor 22 converts the PS data of the character region into the second comparison raster data in accordance with the CPSI drawing method. Processing proceeds to step S05. If the detected drawing object is not a character region (no branch from step S02), processing proceeds to step S05. If the data of the character region corresponds to the character region 60 in the form region 52 (yes from step S03), processing proceeds to step S05. If operations in steps S02 through S04 are not completed for the drawing object of one page included in the PDL data of the document 50 (no branch from step S05), the operations in steps S02 through S04 are repeated until the operations of one page are complete. If the operations of one page are complete (yes branch from step S05), the comparator 24 compares the first comparison raster data with the second comparison raster data on one page (step S06). The comparator 24 outputs the comparison results to the comparison controller 16. The comparison controller 16 causes the display of the UI unit 28 to display information indicative of the comparison results. If a difference is detected between the two pieces of data, information indicative of fault detection is displayed on the display. The comparison process is performed on each page, and the comparison results of each page are displayed on the display. For example, a page number having a detected difference may be displayed on the display.

In the first exemplary embodiment, the first comparison raster data generated in accordance with the APPE drawing method is compared with the second comparison raster data generated in accordance with the CPSI drawing method to detect a print fault (a fault in the RIP process) or to detect the presence or absence of interchangeability between APPE and CPSI. A difference, if detected between the two types of raster data generated by the two types of drawing methods, indicates the occurrence of a fault in the RIP process. Using the two types of drawing methods, a page likely to suffer from a print fault is detected. The presence or absence of interchangeability between APPE and CPSI is detected.

The comparison process (a fault detection process) converts the data of the specific drawing object into the raster data rather than converting all the PDL data into the raster data. Time to generate the raster data is shorter when the specific drawing object is converted into the raster data than when all the PDL data is converted into the raster data. As a result, time to detect a fault becomes shorter.

A print fault in a region different from page to page is detected by performing the comparison process on the variable portion. The variable portion is intended to draw information different from page to page. For example, information, such as personal information, on which security needs to be ensured, is described in a variable character region. A fault in the RIP process might cause information to be drawn on a page different from an originally intended page. For example, information described in the variable character region may be drawn on a page different from an originally intended page. In such a case, target printed matter may not be properly produced, and the security of the information may be degraded. In accordance with the first exemplary embodiment, a fault in the RIP process is detected by performing the comparison process on the variable character region. Even if information in need of security is described in the variable character region, security is thus ensured for the information.

In the first exemplary embodiment, the fault detection process is performed prior to the start of printing. If no fault is detected, the print raster data is printed. Since time to detect a fault is short in comparison with the comparison process that is performed by converting all the PDL data into the raster data, time prior to printing is shortened.

The comparison process (the fault detection process) is performed on the character regions 54 and 56 as described above. The comparison process may be performed on another region. For example, if the image region 58 is a variable region, comparison raster data of the image region 58 may be generated to detect a fault. Photographs may be different from page to page. In such a case, a fault may be detected in the RIP process performed on the image region 58 and the security of the image region 58 is thus ensured.

Second Exemplary Embodiment

A second exemplary embodiment is described with reference to FIG. 5. In the second exemplary embodiment, actual printing and the fault detection process are performed in parallel. The document 50 of FIG. 2 is a print target in the second exemplary embodiment.

When the image forming apparatus 10 is supplied with the PDL data of the document 50, the receiving unit 12 receives the PDL data, and then outputs the PDL data to the first drawing processor 14 and the comparison controller 16.

The first drawing processor 14 analyzes the PDL data of the document 50, and successively generates the print raster data on a page by page basis. Referring to FIG. 5, the first drawing processor 14 generates the print raster data along a time axis, starting with a page 1.

The second drawing processor 18 converts a variable character region in the PDL data (such as the character regions 54 and 56) into the first comparison raster data. The second drawing processor 18 successively generates the first comparison raster data of the character regions 54 and 56 on a page by page basis. Referring to FIG. 5, the second drawing processor 18 generates the first comparison raster data along the time axis, starting with a page 1.

The converter 20 converts the data of the variable character region in the PDL data (such as the character regions 54 and 56) into the PS data. The third drawing processor 22 converts the PS data of the character regions 54 and 56 into the second comparison raster data. The converter 20 successively generates the PS data of the character regions 54 and 56 on a page by page basis while the third drawing processor 22 successively generates the second comparison raster data of the character regions 54 and 56 on a page by page basis. Referring to FIG. 5, the third drawing processor 22 successively generates the second comparison raster data along the time axis, starting with the page 1.

The first drawing processor 14 generates all the print raster data of the document 50. On the other hand, the second drawing processor 18 and the third drawing processor 22 generate the raster data of only the character regions 54 and 56. Time to generates the first comparison raster data and the second comparison raster data is shorter than time to generate the print raster data. Before the generation of the print raster data of the page 1, the generation of the first comparison raster data and the second comparison raster data of the page 1 is complete, and the generation of the first comparison raster data and the second comparison raster data of the page 2 starts. In this way, the first comparison raster data and the second comparison raster data are generated prior to the print raster data.

The generated print raster data is transferred to the printer 40. The printer 40 forms on a recording paper sheet an image responsive to the print raster data. Referring to FIG. 5, the print raster data of pages 1, 2, and 3 is successively generated and then transferred to the printer 40. The images responsive to the print raster data of the pages 1, 2, and 3 are successively formed on the recording paper sheets on the printer 40.

When the print raster data of the page 3 is generated, the first comparison raster data and the second comparison raster data of the page 6 are already generated. On the page 7, a difference appears between the first comparison raster data and the second comparison raster data. For example, characters (amount) are drawn in the character region 56 in the first comparison raster data while no characters are drawn in the character region 56 in the second comparison raster data. More specifically, a drawing omission occurs in the character region 56 of the first comparison raster data. This difference occurs when there is no interchangeability between APPE and CPSI. This difference is detected by the comparator 24. The comparison controller 16 outputs the fault detection information to the printing controller 26, and the printing controller 26 stops printing. For example, the printing controller 26 may cause the printer 40 to stop printing, or may stop outputting the print raster data to the printer 40. Optionally, the printing controller 26 may cause the first drawing processor 14 to stop generating the print raster data.

In accordance with the second exemplary embodiment, the raster data for the fault detection (the first comparison raster data and the second comparison raster data) is generated prior to the raster data that is to be actually printed (the print raster data). Even when the printing operation and the fault detection process are performed in parallel, the printing operation stops with a fault detected prior to the printing of the page having the fault.

The pages prior to the page having the fault may be printed with no problem. As illustrated in FIG. 5, the printing controller 26 may output the print raster data of up to the page 6 to the printer 40, and cause the printer 40 to print all the pages up to the page 6.

Optionally, the comparison controller 16 causes the display of the UI unit 28 to display the page number having the detected fault without stopping printing. In such a case, the printing operation continues. The user references the page number displayed on the display, and simply checks actual printed matter having the detected fault. In this way, without stopping the printing operation, the user checks the page having the detected fault. The user who is notified of the page number having the detected fault may more easily identify the printed matter having the detected fault than when the user is not notified of the page number. If the checking of the printed matter indicates a print fault in the actual printed matter, the user may simply print that page again.

Third Exemplary Embodiment

A third exemplary embodiment is described below. In the third exemplary embodiment, the fault detection process is performed on a reuse drawing object or a drawing object other than the reuse drawing object.

FIG. 6 illustrates an example of the PDL data. The PDL data is data in a PDF format. Among drawing objects specified by "XObject", drawing objects defined by the same ID on different pages are determined to be a reuse drawing object (a drawing object enclosed by broken line in FIG. 6). Identification information of each drawing object is described in the PDL data. Identification information of the reuse drawing object is also described in the PDL data. The reuse drawing object is an image region of a photograph, for example. The image region 58 of FIG. 2 may be specified as the reuse drawing object. The character region or the drawing region may be specified as the reuse drawing object. The reuse drawing object is stored on a memory, such as a cache, and is repeatedly used during the RIP process.

In the third exemplary embodiment, the comparison controller 16 detects the reuse drawing object (XObject) included in the PDL data by analyzing the PDL data. The comparison controller 16 extracts from the PDL data the identification information of the reuse drawing object. The comparison controller 16 counts the number of uses of the reuse drawing object in the same PDL data (use count). The comparison controller 16 extracts a page number on which the reuse drawing object is used in the same PDL data. The comparison controller 16 generates an object table that associates the identification information, the use count, the page number of the reuse drawing object. The object table is stored on a memory (not illustrated).

FIG. 7 illustrates an example of the object table. "ID" in the object table is identification information of the reuse drawing object (XObject). "Type" means the type of the reuse drawing object. In the example of FIG. 7, the image region (continuous-tone image) and the form region are displayed. "Use count" means a use count of the reuse drawing object in the same PDL data. "Pages used" indicate page numbers on which the reuse drawing object is used in the PDL data. For example, the image region identified by "101" is used on pages 1, 3, 5, and 7 in the PDL data. The use count of the image region identified by "101" is "4". The form region identified by "102" is used on all the pages (page 1 through page 10) in the PDL data. The use count is thus 10. A drawing object used once may be specified as XObject. For example, the image region identified by "104" is used on page 5, and the use count is 1.

The comparison controller 16 references the object table, extracts from the PDL data a drawing object as a target of the comparison process (the fault detection process), and outputs the extracted drawing object to the second drawing processor 18 and the converter 20.

In the third exemplary embodiment, two comparison process modes are available. In a first mode (reuse verification mode), the comparison process is performed on the reuse drawing object as a target. In a second mode (non-reuse verification mode), the comparison process is performed on the drawing object other than the reuse drawing object. For example, the user may select the mode using the operation unit of the UI unit 28.

In the RIP process, the reuse drawing object is repeatedly used using a memory, such as a cache. If a difference is detected in the raster data in the reuse verification mode, a fault may be created in the RIP process using the cache. The reuse verification mode may be executed to detect a fault in the RIP process using the memory, such as a cache.

The non-reuse verification mode may be used to detect a fault in a drawing object different in content from page to page (such as the image region or the character region). In the non-reuse verification mode, targets of the fault detection process are a drawing object (such as a character region) that is not specified as "XObject" and a drawing object that is specified as "XObject" but used once.

Figure 8:
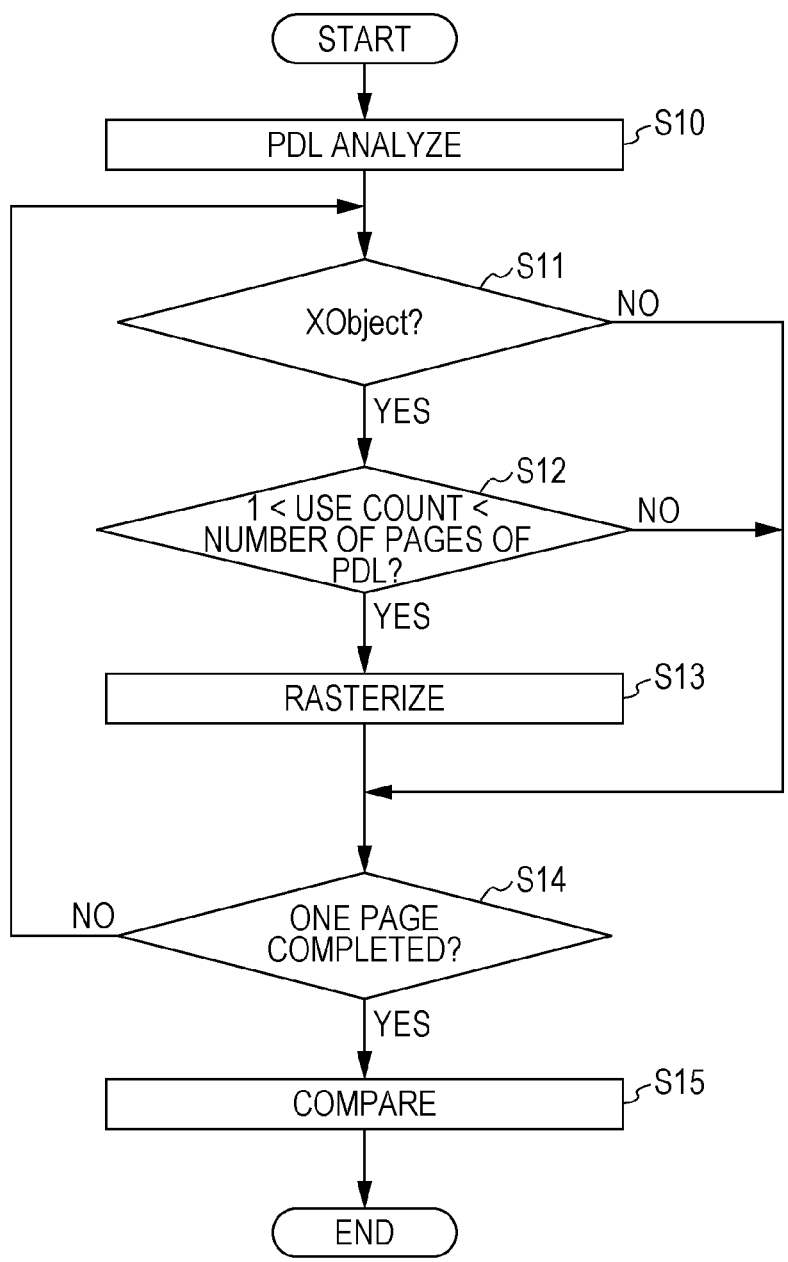
FIG. 8 is a flowchart illustrating a process of a third exemplary embodiment.

The process in the reuse verification mode is described with reference to a flowchart of FIG. 8. The document 50 of FIG. 2 is a print target here. The image forming apparatus 10 performs operations described below on a per page basis. When the image forming apparatus 10 is supplied with the PDL data of the document 50, the receiving unit 12 receives the PDL data and outputs the PDL data to the comparison controller 16. The comparison controller 16 analyzes the PDL data (step S10). A drawing object included in the PDL data is detected, and an object table (such as the object table of FIG. 7) is generated. If the detected drawing object is a reuse drawing object (XObject) (yes branch from step S11), processing proceeds to step S12. If the use count of the reuse drawing object is more than one (two or more), and less than the number of pages of the PDL data (yes branch from step S12), the second drawing processor 18 and the third drawing processor 22 perform the RIP process on (rasterizes) the data of the reuse drawing object (step S13). The data of the reuse drawing object (such as the image region 58) is converted into the first comparison raster data and the second comparison raster data. Processing proceeds to step S14. If the detected drawing object is a reuse drawing object (XObject) (no branch from S11), processing proceeds to step S14. If the use count of the reuse drawing object is one, or is equal to the number of pages of the PDL data (no branch from step S12), processing proceeds to step S14. In other words, a drawing object that is used once is excluded as the target of the fault detection process. The reuse drawing object that is repeatedly used on all pages (such as the form region 52 or the character region 60) is also excluded as the target of the fault detection process. If the reuse drawing object that is repeatedly used on all pages is handled as a target, process load increases, and time to perform the comparison process is prolonged. These reuse drawing objects are thus excluded as the target of the fault detection process. If operations in steps S11 through S13 have not been completed for the drawing object of one page included in the PDL data of the document 50 (no branch from step S14), the operations in steps S11 through S13 are repeated until the process of one page has been completed. If the process of one page is complete (yes branch from step S14), the comparator 24 compares the first comparison raster data and the second comparison raster data (step S15). The comparator 24 outputs information indicative of the comparison results to the comparison controller 16. The comparison controller 16 causes the display of the UI unit 28 to display the information indicative of the comparison results. If a difference is detected between the two pieces of data, information indicative of the detection of a fault is displayed on the display. The comparison process is performed on each page, and the comparison results on each page are displayed on the display. A page number of a page having the detected fault may be displayed on the display. In the same way as in the second exemplary embodiment, printing may be suspended in response to the detection of a fault if the fault detection process and the printing operation are performed in parallel.

The condition in step S12 is described for exemplary purposes. For example, using the operation unit of the UI unit 28, the user may modify the lower limit of the use count to two or above or the upper limit to any number below the number of pages of the PDL data. The number of reuse drawing objects to be extracted as a comparison target may be changed by modifying at least one of the lower limit and the upper limit. The time to perform the comparison process may be modified. For example, as the lower limit is raised, the number of reuse drawing objects to be extracted as a target decreases. As a result, the time to perform the comparison process becomes shorter. As the upper limit is lowered, the number of reuse drawing objects to be extracted as a target decreases. As a result, the time to perform the comparison process becomes shorter. On the other hand, a decrease in the number of reuse drawing objects to be extracted as a target may decrease the accuracy of fault detection. Since there is a tradeoff between the number of reuse drawing objects to be extracted as a target (the lower limit and the upper limit) and time to perform the comparison process, and the accuracy of fault detection, the lower and upper limits may be set in view of process time and detection accuracy. The condition in step S12 is an example of a standard use count condition.

Figure 9:
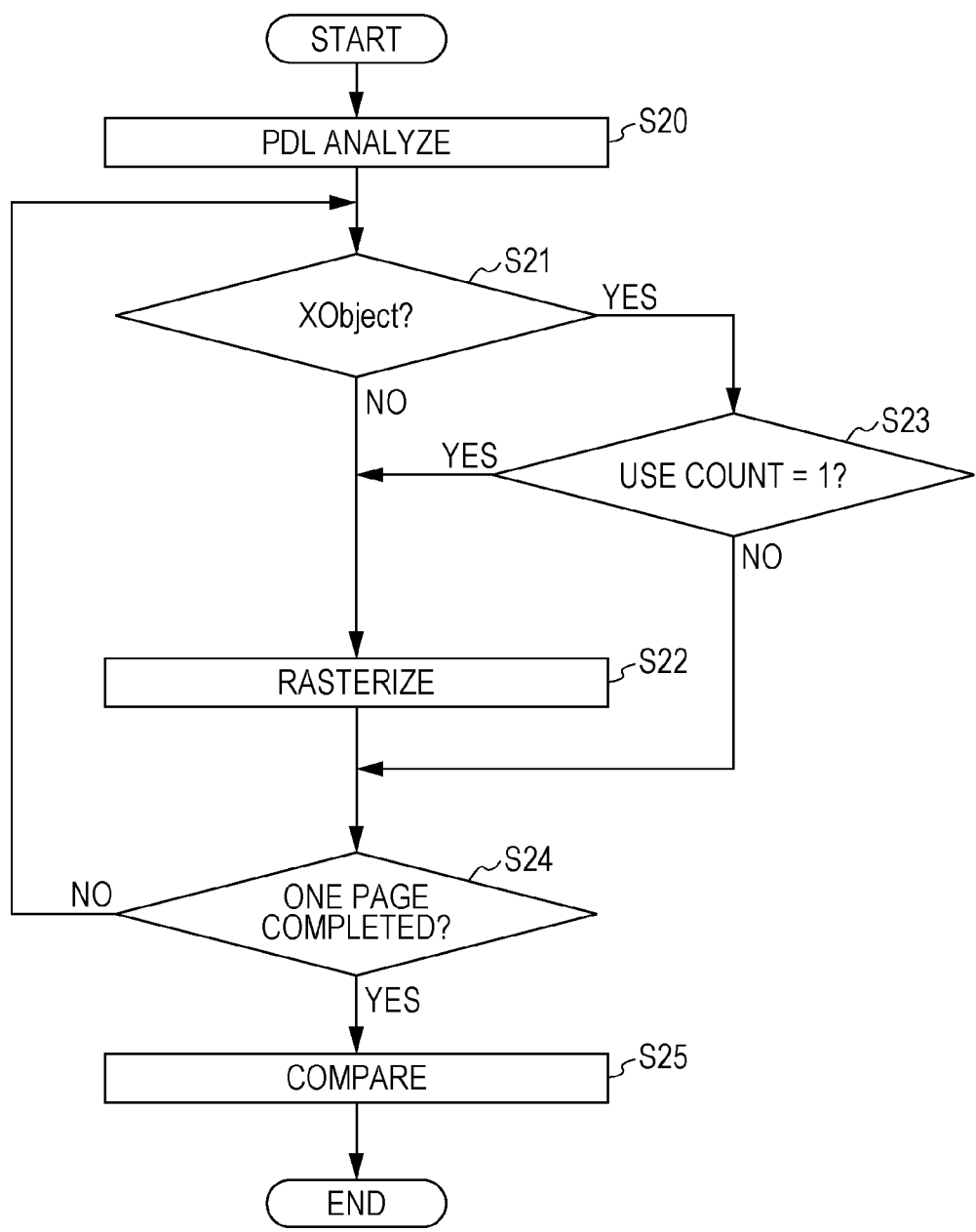
FIG. 9 is a flowchart illustrating a process of the third exemplary embodiment.

The process in the non-reuse verification mode is described with reference to a flowchart of FIG. 9. The document 50 of FIG. 2 is a print target here. The image forming apparatus 10 performs operations described below on a per page basis. When the image forming apparatus 10 is supplied with the PDL data of the document 50, the receiving unit 12 receives the PDL data and outputs the PDL data to the comparison controller 16. The comparison controller 16 analyzes the PDL data (step S20). A drawing object included in the PDL data is detected, and an object table (such as the object table of FIG. 7) is generated. If the detected drawing object is not a reuse drawing object (XObject) (no branch from step S21), the second drawing processor 18 and the third drawing processor 22 perform the RIP process on (rasterizes) the data of the drawing object (step S22). The data of the reuse drawing object (such as the character region 54) is converted into the first comparison raster data and the second comparison raster data. Processing proceeds to step S24. On the other hand, if the detected drawing object is a reuse drawing object (XObject) (yes branch from step S21), processing proceeds to step S23. If the use count of the reuse drawing object is one (yes branch from S23), the second drawing processor 18 and the third drawing processor 22 perform the RIP process on (rasterizes) the data of the reuse drawing object (step S22). In this way, the data of the reuse drawing object is converted into the first comparison raster data and the second comparison raster data. On the other hand, if the use count of the reuse drawing object is two or more (no branch from S23), processing proceeds to step S24. In other words, a drawing object that is used twice or more times is excluded as the target of the fault detection process. If operations in step S21 through S23 have not been complete for the drawing object of one page included in the PDL data of the document 50 (no branch from step S24), the operations in steps S21 through S23 are repeated until the process of the one page is complete. When the process of one page is complete (yes branch from step S24), the comparator 24 compares the first comparison raster data and the second comparison raster data (step S25). The comparator 24 outputs information indicative of the comparison results to the comparison controller 16. The comparison controller 16 causes the display of the UI unit 28 to display the information indicative of the comparison results. If a difference is detected between the two pieces of data, information indicative of the detection of a fault is displayed on the display. The comparison process is performed on each page, and the comparison results on each page are displayed on the display. A page number of a page having the detected fault may be displayed on the display. In the same way as in the second exemplary embodiment, printing may be suspended in response to the detection of a fault if the fault detection process and the printing operation are performed in parallel.

Fault detection is performed in the reuse verification mode in order to detect a print fault in the reuse drawing object. In order to detect a print fault in a drawing object other than the reuse drawing object, fault detection is performed in the non-reuse drawing verification mode. Mode selection is performed depending on the purpose of the detection.

In the exemplary embodiments, the comparison process is performed using 1-bit raster data. Alternatively, the comparison process may be performed using raster data of several bits (for example, 8-bit raster data). Increasing the bits allows a difference in color to be detected. The comparison process may be performed using intermediate data. The intermediate data is data in a data format between the PDL data and the raster data. The intermediate data is generated by the comparison controller 16. The comparison process performed using the intermediate data takes time shorter than the comparison process performed using the raster data. In another example, the comparison process may be performed using lower resolution data. The comparison process thus takes short time in comparison with the comparison process using higher resolution raster data.

The comparison process of the exemplary embodiments may be performed prior to the printing operation or may be performed in parallel with the printing operation as in the second exemplary embodiment. To ensure a high level of security, the comparison process may be performed prior to the printing operation.

The user may specify a drawing object as a comparison target. For example, the comparison controller 16 causes the display of the UI unit 28 to display specified image data (such as specified raster data). The user specifies the drawing object as the comparison target using the operation unit of the UI unit 28. The comparison controller 16 extracts the data of the drawing object specified by the user from the PDL data, and outputs the data of the drawing object to the second drawing processor 18 and the converter 20. The first comparison raster data and the second comparison raster data of the drawing object specified by the user are thus generated to be compared.

The image forming apparatus 10 may be implemented by a hardware resource and a software resource that operates in cooperation with the hardware resource. More specifically, the image forming apparatus 10 includes a processor, such as a CPU (not illustrated). Each function of the image forming apparatus 10 is implemented when the processor reads a program stored on a storage device (not illustrated) and executes the program. The program may be stored on the memory from a recording device, such as a compact disk (CD) or a digital versatile disk (DVD), or via a communication medium, such as a network. Each of the functions of the image forming apparatus 10 may be implemented by hardware resources, including a processor and an electronic circuit. The electronic circuits may include a device, such as a memory. In another example, each function of the image forming apparatus 10 may be implemented by a digital signal processor (DSP) or a field programmable gate array (FPGA).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
a controller configured to receive print data in page description language (PDL) format;
a first drawing processor configured to convert a variable drawing object selected from among drawing objects of the print data in the PDL format to first raster image data using a first drawing method that converts print data in the PDL format to raster image data;
a second drawing processor configured to convert the variable drawing object to second raster image data using a second drawing method that converts print data in the PDL format to raster image data;
a comparator configured to compare the first raster image data to the second raster image data;
a drawing processor configured to convert the print data in PDL format to print raster data to be output by the image forming apparatus to a recording medium; and
a printing controller configured to control output of the print raster data, based on a result of the comparator comparing the first raster image data to the second raster image data,
wherein the first drawing processor is controlled to convert the variable drawing object to the first raster image data using the first drawing method before the drawing processor converts the print data in PDL format to the print raster data,
wherein the second drawing processor is controlled to convert the variable drawing object to the second raster image data using the second drawing method before the drawing processor converts the print data in PDL format to the print raster data, and wherein the printing controller is further configured to control the drawing processor to output the print raster data in response to the result of the comparator indicating that the first raster image data matches the second raster image data and control the drawing processor to withhold output of the print raster data in response to the result of the comparator indicating that the first raster image data does not match the second raster image data.

2. The image forming apparatus according to claim 1, wherein the variable drawing object comprises a drawing object that is unique to a page of the print data from among the drawing objects of the print data.

3. The image forming apparatus according to claim 2, wherein the first drawing processor is further configured to select the variable drawing object from among the drawing objects of the print data in the PDL format, and wherein the second drawing processor is further configured to select the variable drawing object from among the drawing objects of the print data in the PDL format.

4. The image forming apparatus according to claim 1, wherein the first drawing processor is further configured to select the variable drawing object from among the drawing objects of the print data in the PDL format, and wherein the second drawing processor is further configured to select the variable drawing object from among the drawing objects of the print data in the PDL format.

5. The image forming apparatus according to claim 1, wherein the variable drawing object comprises a drawing object that is reused among variable portions of a plurality of pages of the print data from among the drawing objects of the print data.

6. The image forming apparatus according to claim 5, wherein the first drawing processor is further configured to select the variable drawing object from among the drawing objects of the print data in the PDL format, and wherein the second drawing processor is further configured to select the variable drawing object from among the drawing objects of the print data in the PDL format.

7. The image forming apparatus according to claim 1, wherein the variable drawing object comprises a character region from among the drawing objects of the print data.

8. The image forming apparatus according to claim 7, wherein the first drawing processor is further configured to select the variable drawing object from among the drawing objects of the print data in the PDL format, and wherein the second drawing processor is further configured to select the variable drawing object from among the drawing objects of the print data in the PDL format.

9. The image forming apparatus according to claim 1, wherein the printing controller is further configured to withhold output of the print raster data by stopping printing.

10. The image forming apparatus according to claim 1, wherein the first drawing method is Adobe Portable Document Format Print Engine (APPE), and wherein the second drawing method is Configurable Postscript Interpreter (CPSI).

11. The image forming apparatus according to claim 1, wherein the first drawing processor is further configured to convert only the variable drawing object from among the drawing objects of the print data in the PDL format to the first raster image data using the first drawing method, and wherein the second drawing processor is further configured to convert only the variable drawing object from among the drawing objects of the print data in the PDL format to the second raster image data using the second drawing method.

12. An image forming method comprising:

receiving print data in page description language (PDL) format;

converting a variable drawing object selected from among drawing objects of the print data in the PDL format to first raster image data using a first drawing method that converts print data in the PDL format to raster image data;

converting the variable drawing object to second raster image data using a second drawing method that converts print data in the PDL format to raster image data;

comparing the first raster image data to the second raster image data;

converting the print data in PDL format to print raster data to be output by the image forming apparatus to a recording medium; and outputting the print raster data, based on a result of the comparing, wherein the converting the variable drawing object to the first raster data comprises convert the variable drawing object to the first raster image data using the first drawing method before the converting the print data in PDL format to the print raster data, wherein the converting the variable drawing object to the second raster data comprises convert the variable drawing object to the second raster image data using the second drawing method before the converting the print data in PDL format to the print raster data, and wherein the outputting comprises outputting the print raster data in response to the result of the comparing indicating that the first raster image data matches the second raster image data and withholding output of the print raster data in response to the result of the comparing indicating that the first raster image data does not match the second raster image data.

13. The method according to claim 12, wherein the variable drawing object comprises a drawing object that is unique to a page of the print data from among the drawing objects of the print data.

14. The method according to claim 12, further comprising:

selecting the variable drawing object from among the drawing objects of the print data in the PDL format.

15. The method according to claim 12, wherein the variable drawing object comprises a drawing object that is reused among variable portions of a plurality of pages of the print data from among the drawing objects of the print data.

16. The method according to claim 12, wherein the variable drawing object comprises a character region from among the drawing objects of the print data.

17. The method according to claim 12, wherein the withholding output of the print raster data comprises:

stopping printing.

18. The method according to claim 12, wherein the first drawing method is Adobe Portable Document Format Print Engine (APPE), and wherein the second drawing method is Configurable Postscript Interpreter (CPSI).

19. The method according to claim 12, wherein the converting the variable drawing object using the first drawing method comprises converting only the variable drawing object from among the drawing objects of the print data in the PDL format to the first raster image data using the first drawing method, and wherein the converting the variable drawing object using the second drawing method comprises converting only the variable drawing object from among the drawing objects of the print data in the PDL format to the second raster image data using the second drawing method.

20. A non-transitory computer readable medium storing a program causing a computer to execute a process for forming an image, the process comprising:
  receiving print data in page description language (PDL) format;
  converting a variable drawing object selected from among drawing objects of the print data in the PDL format to first raster image data using a first drawing method that converts print data in the PDL format to raster image data;
  converting the variable drawing object to second raster image data using a second drawing method that converts print data in the PDL format to raster image data;
  comparing the first raster image data to the second raster image data;
  converting the print data in PDL format to print raster data to be output by the image forming apparatus to a recording medium; and
  outputting the print raster data, based on a result of the comparing,
  wherein the converting the variable drawing object to the first raster data comprises convert the variable drawing object to the first raster image data using the first drawing method before the converting the print data in PDL format to the print raster data,
  wherein the converting the variable drawing object to the second raster data comprises convert the variable drawing object to the second raster image data using the second drawing method before the converting the print data in PDL format to the print raster data, and
  wherein the outputting comprises outputting the print raster data in response to the result of the comparing indicating that the first raster image data matches the second raster image data and withholding output of the print raster data in response to the result of the comparing indicating that the first raster image data does not match the second raster image data.

* * * * *